US006972546B2

(12) United States Patent
Kobayashi

(10) Patent No.: US 6,972,546 B2
(45) Date of Patent: Dec. 6, 2005

(54) POWER SYSTEM

(75) Inventor: Hidenori Kobayashi, Tokyo (JP)

(73) Assignee: Fuji Electric Holdings Co., Ltd., (JP)

( * ) Notice: Subject to any disclaimer, the term of this patent is extended or adjusted under 35 U.S.C. 154(b) by 63 days.

(21) Appl. No.: 10/797,627

(22) Filed: Mar. 10, 2004

(65) Prior Publication Data

US 2004/0239301 A1 Dec. 2, 2004

(30) Foreign Application Priority Data

Apr. 16, 2003 (JP) ............................ 2003-111277

(51) Int. Cl.[7] .............................................. G05F 3/16
(52) U.S. Cl. ...................................... 323/225; 323/285
(58) Field of Search ............................... 323/282–285, 323/225, 222, 299, 272; 363/16–20

(56) References Cited

U.S. PATENT DOCUMENTS

| | | | | |
|---|---|---|---|---|
| 4,293,902 A * | 10/1981 | White | 363/26 |
| 5,146,395 A * | 9/1992 | McKie | 363/13 |
| 5,396,163 A * | 3/1995 | Nor et al. | 320/159 |
| 5,912,552 A * | 6/1999 | Tateishi | 323/285 |
| 6,396,252 B1 * | 5/2002 | Culpepper et al. | 323/285 |
| 6,833,691 B2 | 12/2004 | Chapuis | |
| 6,853,169 B2 | 2/2005 | Burstein et al. | |
| 6,914,419 B2 | 7/2005 | Katayama | |

FOREIGN PATENT DOCUMENTS

JP 2001-211640 A 8/2001

* cited by examiner

*Primary Examiner*—Rajnikant B. Patel
(74) *Attorney, Agent, or Firm*—Rossi, Kimms & McDowell, LLP

(57) ABSTRACT

A power system causes no variation in output voltage during switching from a linear regulator to a DC-DC converter. The power system switches off a drive circuit of a DC-DC converter and supplies voltage to a load from a linear regulator if the load is light, while the power system halts voltage supply to the load from the linear regulator and switches the drive circuit of the DC-DC converter on if the load is heavy. During a set period of time after the load changes from light to heavy, the linear regulator continues to supply voltage to the load while the DC-DC converter supplies a pseudo feedback signal to a control circuit in place of a feedback signal, with the drive circuit left off to control the time ratio at switching elements and, thus minimizing output voltage variations.

4 Claims, 6 Drawing Sheets

POWER SYSTEM

BACKGROUND OF THE INVENTION

The present invention relates to a power system for outputting a voltage to a load by switching between power devices, and more particularly to a power system that are designed to prevent a decline in output voltage during switching from a series regulator to a DC-DC converter when the DC-DC converter and the series regulator are selectively used, depending on the magnitude of the load.

Some electronic equipment incorporates multiple power devices that step an externally supplied source voltage down to a level suitable for internal electronic circuitry. The power conversion efficiency of such power devices varies according to the magnitude of the load connected to the output stage in some devices, while the power conversion efficiency remains unchanged in others.

In the case of a DC-DC converter that steps down voltage by PWM control, for instance, the lighter the connected load the lower the power efficiency, while the heavier the connected load the higher the power efficiency. This is because drive loss occurs as a result of the turning on/off of internal semiconductor switches in the DC-DC converter. On the other hand, a series regulator that controls output voltage by continuously varying the magnitude of the equivalent series resistance between its input and output can achieve constant efficiency regardless of the magnitude of the load A power system has traditionally been proposed as a DC power control method that switches between the series regulator and the DC-DC converter, according to the magnitude of the load on the output side. The power system uses the series regulator to step down the voltage under a light load, and uses the DC-DC converter to do the same if the connected load is heavy and the DC-DC converter power efficiency exceeds that of the series regulator (as described, for example, Japanese Unexamined Patent Application Publication No. 11-341797 and Japanese Unexamined Patent Application Publication No. 2002-112457).

Such a power system that outputs voltage to a load by switching between power devices can provide higher efficiency at the rated output and reduce power consumption under a light load at the same time, if the system is incorporated into battery-powered electronic equipment having normal and standby modes. That is, as the load is light in standby mode because only a few electronic circuits are being driven, the voltage is stepped down by the series regulator. On the other hand, as the load is heavy in normal mode because multiple electronic circuits are being driven, the voltage is stepped down by the DC-DC converter.

FIG. 3 illustrates a block diagram of a first conventional example of the power system. In the first conventional example, the power system is configured with a step-down synchronous rectification DC-DC converter 40 and a linear regulator 50 such as a series regulator, which are simply connected in parallel. Of these, the DC-DC converter 40 comprises a control circuit unit consisting of an error amplifier 41 that calculates the error between the output voltage to the load and the reference voltage, a comparator 42 that compares the error and a triangular wave to output a high/low square wave, a drive circuit 43, and a pair of switching elements 44 and 45. The switching elements 44 and 45 operate so that an input voltage Vin and a ground potential are alternately supplied to a load 60 via an inductor L, and are configured so as to be controlled to permit switching on/off with an external signal. The linear regulator 50 is provided with an error amplifier 51 and a variable resistance circuit 52 that supplies the input voltage Vin to the load 60 and is configured so as to be controlled to permit switching on/off with an external signal, as in the case of the DC-DC converter 40.

In this example, a connection point between one end of the inductor L on the opposite side of the switching elements 44 and 45 and the variable resistance circuit 52 is used as an output terminal 70. A series circuit consisting of voltage-dividing resistors R1 and R2 and one end of an output capacitance C1 provided for smoothing purposes are connected to the output terminal 70. The other end of the output capacitance C1 is grounded, thus smoothing the output voltage to the load 60 connected to the output terminal 70. A feedback signal, obtained by dividing the output voltage to the load 60 by the voltage-dividing resistors R1 and R2, is fed back to the error amplifier 41 of the DC-DC converter 40 and the error amplifier 51 of the linear regulator 50. Note that although a signal line 80 for feedback control of the feedback signal, extending from the connection point between the voltage-dividing resistors R1 and R2, is used for connection of both the DC-DC converter 40 and the linear regulator 50, two separate signal lines may be used for connection.

The comparatively complex DC-DC converter 40 is provided with a feedback phase compensation circuit consisting of a resistor R3 and a capacitor C2 to suppress oscillation in the error amplifier 41. For this reason, a certain amount of time is required for the DC-DC converter 40 to start to output a stable voltage to the load 60. Therefore, simply switching from the linear regulator 50 to the DC-DC converter 40 will result in substantial variation in the output voltage to the load 60 during the period until the switching operation to the DC-DC converter 40 stabilizes.

FIG. 4 is a timing diagram showing the voltage variation during operation switching in the first conventional example. In this example, the linear regulator 50 stops and the DC-DC converter 40 starts operation at time t0. The dotted line ascending from time t0 represents the output voltage from the DC-DC converter 40 alone. Thus, as the output voltage from the DC-DC converter 40 rises at time t0 for the first time, the voltage to the load 60 must be maintained by the output capacitance C1 alone for a set period of time immediately after switching, until time t1 when the output voltage reaches a target voltage Vt determined by the reference voltage. For this reason, the output terminal 70 voltage drops substantially during the period from time t0 to time t1.

Namely, as the output voltage of the linear regulator 50 is maintained at a level virtually equal to the target voltage Vt by the output capacitance C1 immediately after operation of the DC-DC converter 40, only a small error signal is input to the linear regulator 50. For this reason, even if the DC-DC converter 40 is capable of starting up extremely quickly, the converter cannot increase its output voltage. Therefore, as the DC-DC converter 40 begins increasing the voltage only when the output voltage of the output terminal 70 declines, switching between the linear regulator 50 and the DC-DC converter 40 simply by connecting them together cannot prevent a voltage decline, even if a low high speed DC-DC converter 40 is used. In the case of a synchronous rectification DC-DC converter in particular, an extremely large output voltage decline results when the grounded switching element 45 on the low side turns on, as the switching element 45 draws in the charge of the output capacitance C1.

FIG. 5 is a block diagram of a second conventional example of the power system. The power system is configured so that the voltage-dividing resistors R1, R2, R4, and R5, as well as output capacitances C1 and C3, are connected to the output sides of the power devices, and so that the DC-DC converter 40 and the linear regulator 50 are separable by a switch SW1. In this example, provision of the switch SW1 on the output side of the DC-DC converter 40 enables independent control of feedback signals to the DC-DC converter 40 and the linear regulator 50 via signal lines 80 and 81. Therefore, while the linear regulator 50 is operating, the switching operation of the DC-DC converter 40 is performed with the switch SW1 left off to prepare for the output of the target voltage in advance.

FIG. 6 illustrates a timing diagram showing the voltage variation during operation switching in the second conventional example. As shown in FIG. 6, the drive circuit 43 of the DC-DC converter 40 is switched on at time t0 with the switch SW1 left off and without halting the linear regulator 50, thus enabling both the DC-DC converter 40 and the linear regulator 50 to operate in parallel. At time t1, when the target voltage Vt output is stably available with no current supplied to the load 60 from the DC-DC converter 40, the linear regulator 50 is halted and the switch SW1 is switched on. Such switching enables the immediate supply of a stable output voltage from the DC-DC converter 40 to the load 60 connected to the output terminal 70 at time t1 onward.

Namely, as long as the switch SW1 is left off, the DC-DC converter 40 can increase the current independently through its switching operation, even if the target output voltage is being generated by the linear regulator 50. For this reason, it is possible to switch between the outputs of the linear regulator 50 and the DC-DC converter 40 after the feedback control of the DC-DC converter 40 stabilizes by providing a period of time (t0 to t1) during which the DC-DC converter 40 and the linear regulator 50 operate in parallel until the outputs of the linear regulator 50 and the DC-DC converter 40 become equal.

However, provision of the switch SW1 in the output current flow path to separate the DC-DC converter 40 and the linear regulator 50 requires a high-capacity switch, increasing costs. Moreover, the resistance of the switch SW1 adversely affects the power conversion efficiency of the power system. Further, an increase in the number of constituent components other than the power devices, such as the output capacitances C1 and C3, makes it difficult to realize the power system as an IC, in addition to disadvantages in cost and efficiency.

It would therefore be desirable to provide a power system that causes no variation in output voltage during switching from a linear regulator to a DC-DC converter and that is suitable for realization in IC form.

SUMMARY OF THE INVENTION

A power system is provided that outputs voltage to a load by switching between power devices. The power system comprises an inductor, switching elements for supplying input voltage to said load via said inductor, a drive circuit that generates a drive signal for complementarily performing on/off control of said switching elements at a predetermined time ratio, and a control circuit that switches said drive circuit on or off and that controls the time ratio at said switching elements by a feedback signal based on said output voltage to said load, the power system being provided with a DC-DC converter for controlling said output voltage at a predetermined level, a pseudo-feedback-signal generating circuit that generates a pseudo feedback signal in synchronization with said drive signal of said DC-DC converter, and a series regulator that supplies said input voltage to said load after stepping down said input voltage.

The power system switches off the drive circuit of said DC-DC converter and supplies voltage to said load from said series regulator when said load is light, halts voltage supply from said series regulator and switches on the drive circuit of said DC-DC converter to supply voltage to said load when said load is heavy, and continually supplies voltage from said series regulator to said load for a predetermined period of time when a voltage supply source to said load is switched from said series regulator to said DC-DC converter.

The DC-DC converter supplies said pseudo feedback signal in place of the feedback signal to said control circuit while leaving said drive circuit off in order to control the time ratio at said switching elements, and when said predetermined period of time elapses, halts voltage supply from said series regulator, switches said pseudo feedback signal to said feedback signal, and starts on/off operations of said switching elements by switching on said drive circuit. Smooth switching between power devices connected to the load minimizes variations in output voltage during switching, preventing the malfunction of electronic equipment connected to an output terminal.

BRIEF DESCRIPTION OF THE DRAWINGS

The invention will now be described in greater detail with reference to certain preferred embodiments thereof and the accompanying drawings, wherein.

DETAILED DESCRIPTION OF THE PREFERRED EMBODIMENTS OF THE INVENTION

Figure 1:
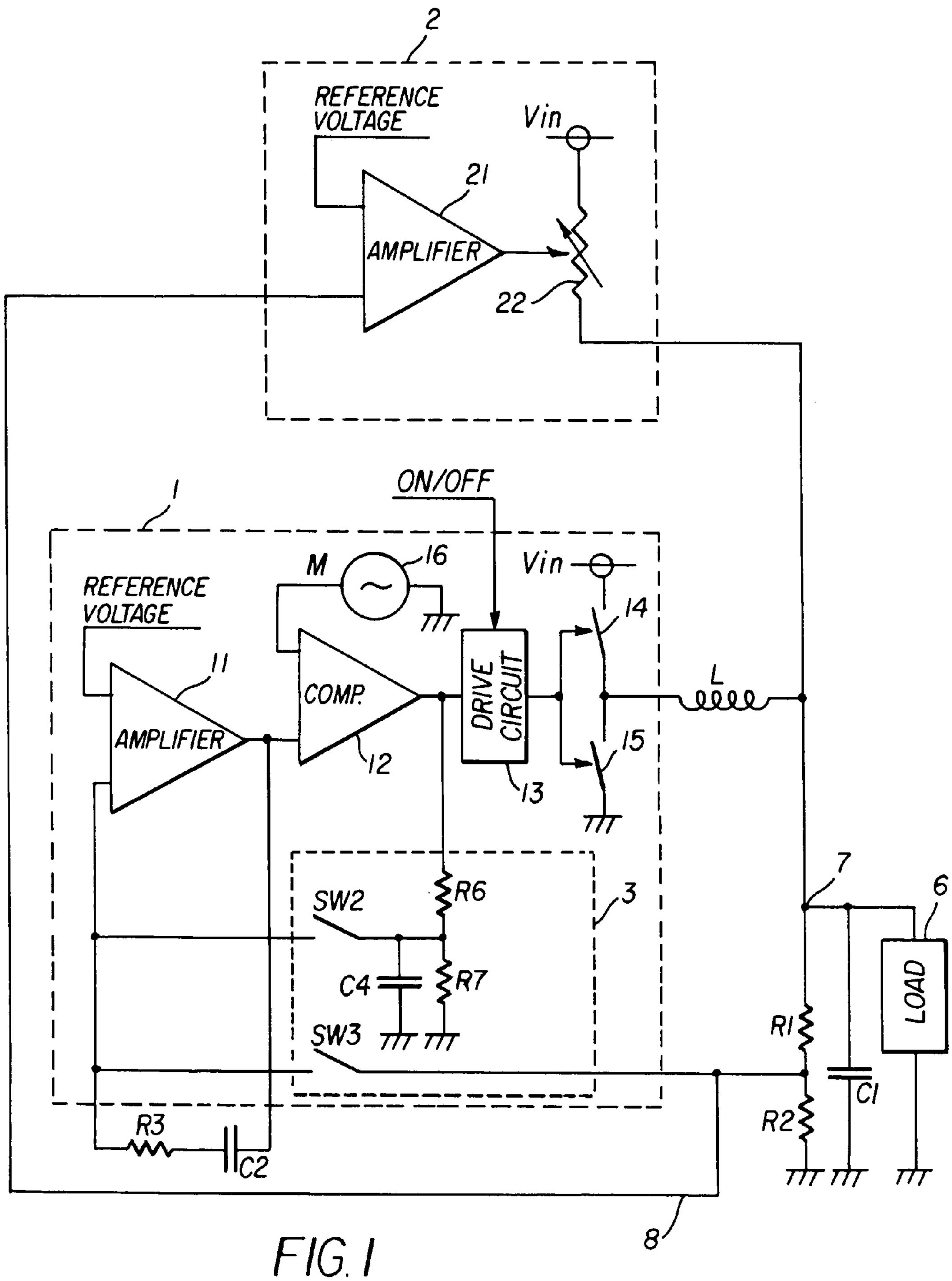
FIG. 1 is a circuit diagram showing the configuration of a power system associated with a first embodiment of the present invention.

FIG. 1 is a circuit diagram showing the configuration of a power system associated with a first embodiment of the present invention. With the power system shown in FIG. 1, a DC-DC converter 1 comprises a control circuit unit consisting of an error amplifier 11 that calculates the error between the output voltage to a load 6 and the reference voltage, a comparator 12 that compares the error and a triangular wave to output a high/low square wave and an oscillator 16, a drive circuit 13 that can be switched on or off by an external on/off signal, and a pair of switching elements 14 and 15 for alternately supplying an input voltage Vin and a ground potential to the load 6 via an inductor L.

Figure 3:
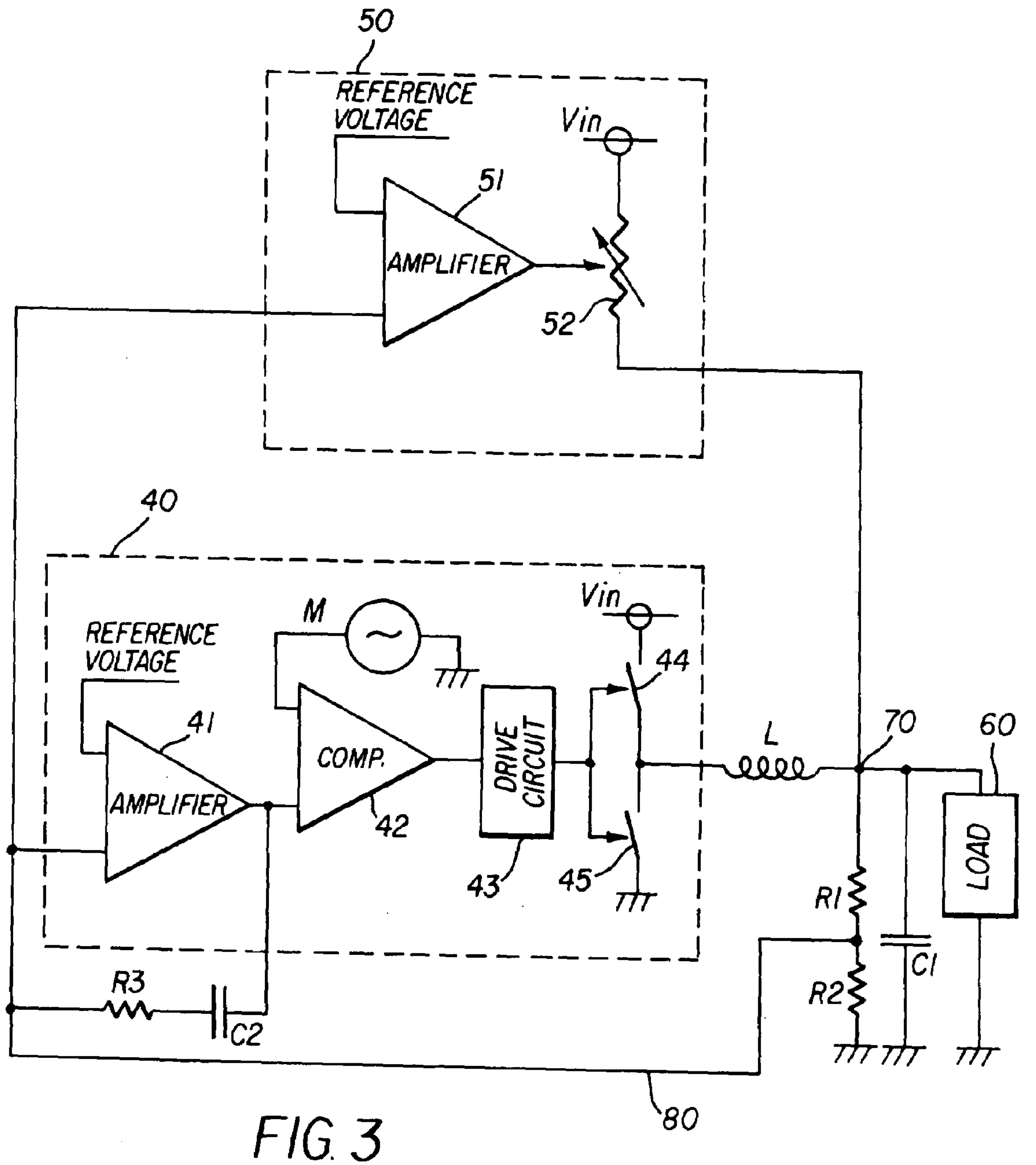
FIG. 3 is a block diagram of a first conventional example of the power system.
Figure 4:
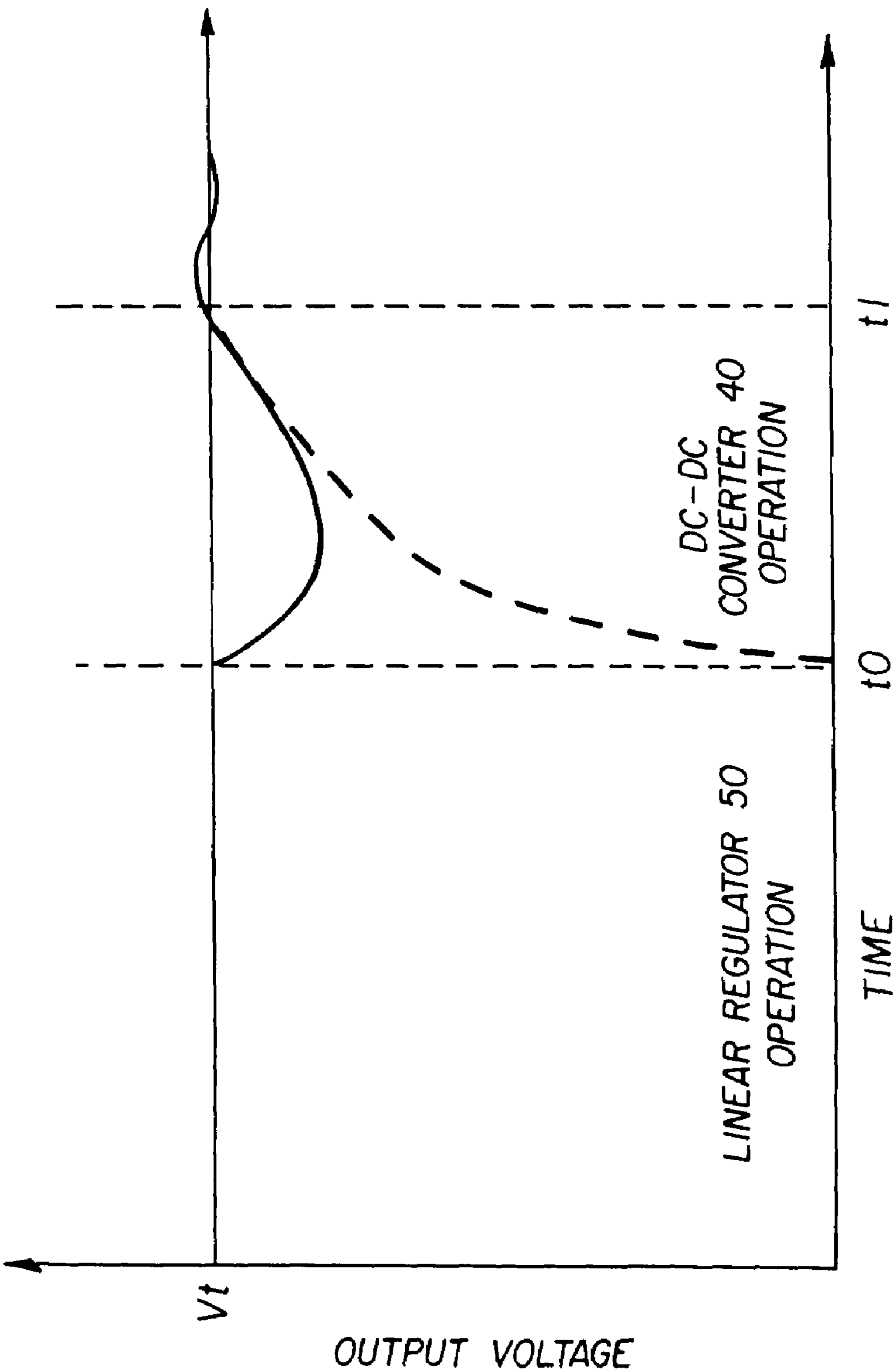
FIG. 4 is a timing diagram showing voltage variations during operation switching in the first conventional example.
Figure 5:
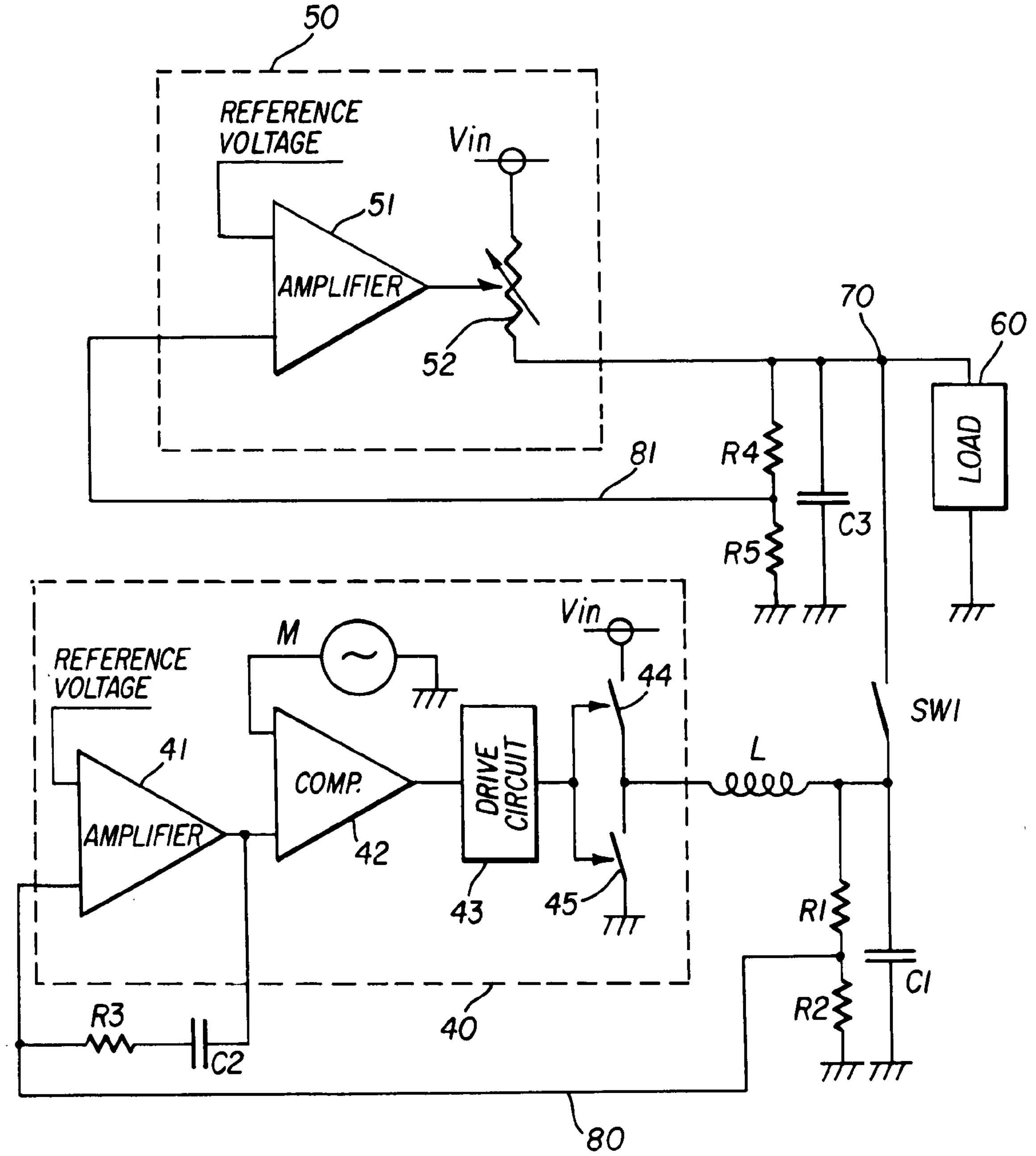
FIG. 5 is a block diagram of a second conventional example of the power system.

A linear regulator 2 comprises an error amplifier 21 and a variable resistance circuit 22 that supplies the input voltage Vin to the load 6. A connection point between the variable resistance circuit 22 and one end of the inductor L on the opposite side of the switching elements 14 and 15 serves as an output terminal 7 for the power system. A series circuit consisting of voltage-dividing resistors R1 and R2 and one end of the output capacitance C1 provided for smoothing purposes are connected to the output terminal 7, as in the case of the conventional examples shown in FIGS. 3 and 5.

Further, the control circuit unit of the DC-DC converter 1 is provided with a pseudo-feedback-signal generating circuit 3 consisting of resistors R6 and R7 (first and second resistors) connected in series between the output side of the comparator 12 and the ground potential, a capacitor C4 connected to a connection point between the resistors R6 and R7, and a pair of switches SW2 and SW3. One end of the resistor R6 is connected to the output end of the comparator 12, while the other end of the resistor R7 is grounded. The capacitor C4, one end of which is grounded, is combined with the resistor R6 to form a low-pass filter. The potential at the connection point between the resistors R6 and R7 is fed back to one end of the error amplifier 11 via the switch SW2 as a pseudo feedback signal.

The feedback signal, obtained by dividing the output voltage to the load 6 by the voltage-dividing resistors R1 and R2, is fed back to the error amplifier 11 of the DC-DC converter 1 when the SW3 is on, and the same feedback signal is also fed back to the error amplifier 21 of the linear regulator 2 via a signal line 8 for feedback control. Note that while the error amplifier 11 input does not become an open circuit if either of the pair of switches SW2 or SW3 is on, the pair of switches SW2 and SW3 are controlled so that they do not turn on simultaneously to prevent short-circuiting of the feedback and pseudo feedback signals. Note also that the resistors R6 and R7 are set up so that the voltage division ratio of R6/R7 is the same as that of R1/R2 (third and fourth resistors).

Figure 6:
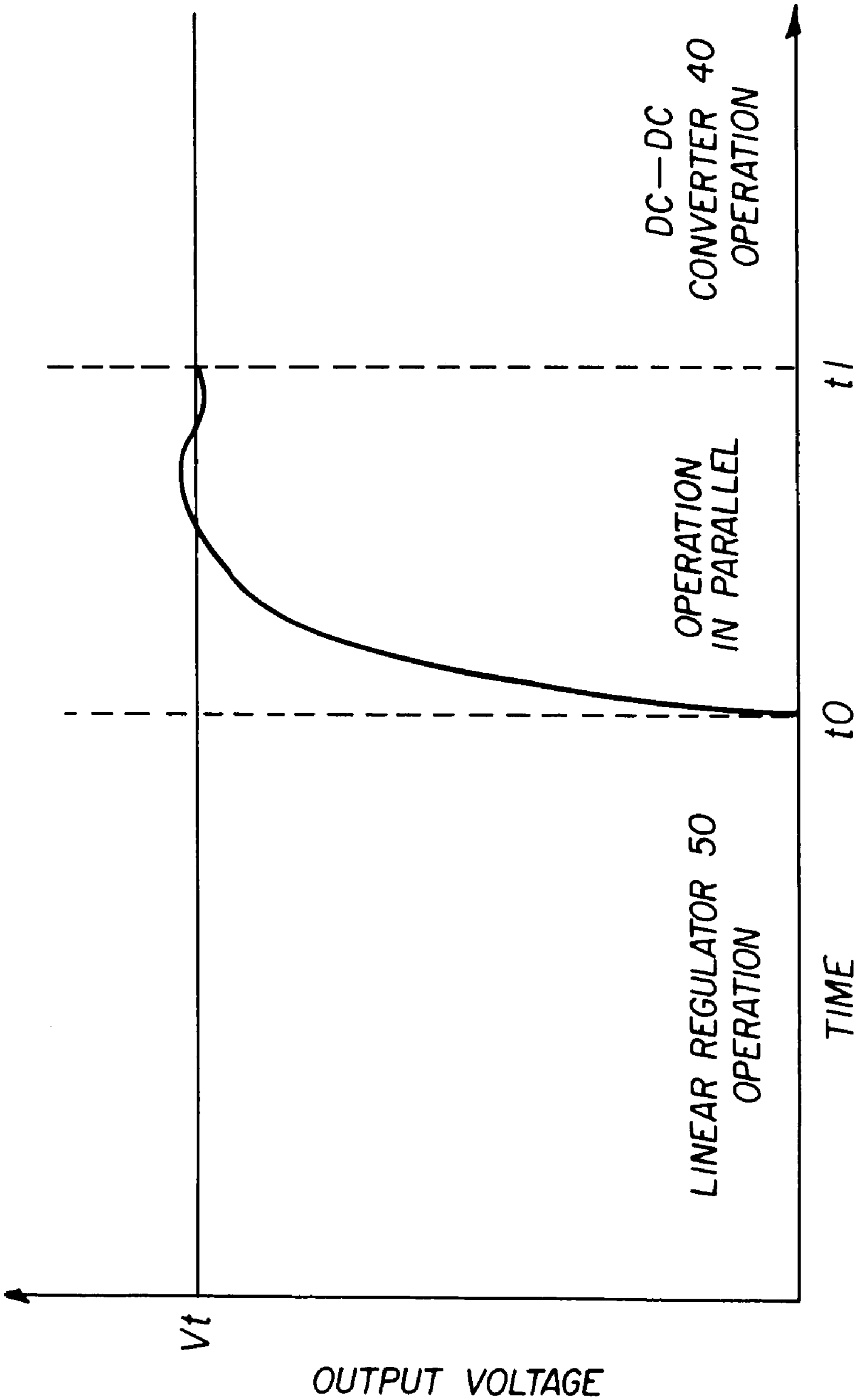
FIG. 6 is a timing diagram showing voltage variations during operation switching in the second conventional example.

The operation of the power system thus configured will be described next. With the power system shown in FIG. 1, a transient period (the period from t0 to t1 shown in FIG. 6) is provided during which the DC-DC converter 1 and the linear regulator 2 operate in parallel until the DC-DC converter 1 output becomes equal to the output voltage of the linear regulator 2, as in the case of switching between power devices in the second conventional example. The linear regulator 2 is not halted at tine t0 with the switch SW3 left off, but is halted after control of the DC-DC converter 1 stabilizes. For this reason, the switching elements 14 and 15 at the output stage and the drive circuit 13 are configured so that they can be independently switched on or off, and both the switching elements 14 and 15 are switched off (left open) if the drive circuit 13 is not on. Note that the oscillator 16, the error amplifier 11, and the comparator 12, comprising the DC-DC converter 1, and the linear regulator 2 are also configured so that they can be switched on or off.

The power system operations during switching from the linear regulator 2 to the DC-DC converter 1 will be described individually. When the linear regulator 2 operates, all circuit elements of the DC-DC converter 1 are halted to suppress power consumption. Instead of allowing complete immediate switching, a transient period is provided for switching. That is, the DC-DC converter 1 operates all of its components other than the drive circuit 13 in parallel, with the linear regulator 2 left in operation. At this time, switching the SW2 on and the SW3 off enables the connection point voltage between the resistors R6 and R7—the resistors dividing the comparator 12 output voltage—to be fed back to the error amplifier 11.

With the synchronous rectification DC-DC converter 1, if the resistive component of the inductor L is sufficiently small to be negligible or if the output current to the load 6 is small, the signal voltage filtered via the low-pass filter constituted by the capacitor C4 becomes equal to that of the feedback signal obtained by dividing the voltage at the output terminal 7 using the voltage-dividing resistors R1 and R2. For this reason, the connection point voltage between the resistors R6 and R7 can be used as a pseudo output signal to perform feedback control of the DC-DC converter 1. At this time, the DC-DC converter 1 and the linear regulator 2 can be controlled independently, with the operation of the linear regulator 2 remaining completely intact, by leaving both the switching elements 14 and 15 off and by controlling the drive circuit 13 so that the circuit is not activated by an external signal. Unlike the switch SW1 provided in the output current path in FIG. 5, the switches SW2 and SW3 provided in the feedback path need only be small-capacity switches, making it possible to readily implement the circuitry, including the switches on chips, if the power system is to be configured as an IC.

Note that the transient period is maintained until control of the DC-DC converter 1 stabilizes. Because the oscillator 16 connected to the comparator 12 operates, the transient period can be determined assuming a fixed delay time using a digital counter or other devices. A judgment may also be made at the error amplifier 11 as to whether the difference between the error signal fed back from the comparator 12 output and the reference voltage signal is equal to or less than the fixed level by providing a stabilization judgment circuit at the DC-DC converter 1.

After the DC-DC converter 1 stabilizes, the linear regulator 2 is halted and the drive circuit 13 is operated. If the DC-DC converter 1 operates stably in the same manner as when the target voltage Vt is output immediately before the linear regulator 2 is halted, the output voltage variation at the output terminal 7 will be extremely small during switching.

In contrast to the aforementioned switching operation, switching from the DC-DC converter 1 to the linear regulator 2 is performed with no transient period during which the DC-DC converter 1 and the linear regulator 2 are operated in parallel.

Figure 2:
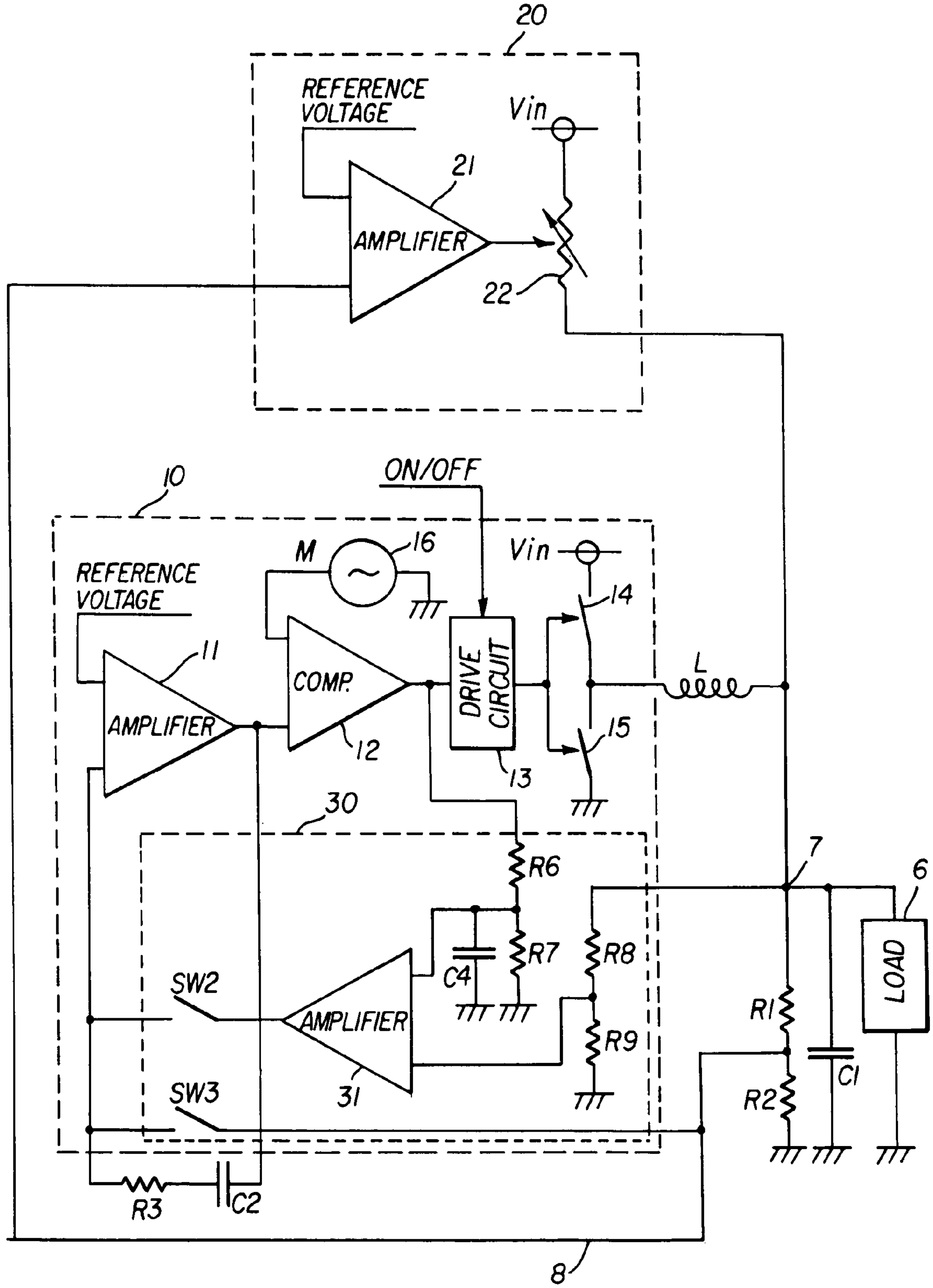
FIG. 2 is a circuit diagram showing the configuration of a power system associated with a second embodiment of the present invention.

FIG. 2 illustrates a circuit diagram showing the configuration of a power system that differs from the system described above. In a configuration of the power system of the present invention in the form of a semiconductor IC, if the magnitude of the output voltage to the load 6 is set up by externally connecting the voltage-dividing resistors R1 and R2, the resistance values of the resistors R6 and R7 of a pseudo-feedback-signal generating circuit 30 cannot be fixed to obtain a pseudo feedback signal by dividing a signal drawn from the input side of the drive circuit 13 in a DC-DC converter 10.

In the power system of the second embodiment, therefore, the pseudo-feedback-signal generating circuit 30 comprises the resistors R6 and R7 (first and second resistors) that are connected in series between the output side of the comparator 12 and the ground potential, the capacitor C4 connected to the connection point between the resistors R6 and R7, the pair of switches SW2 and SW3, an error amplifier 31, and a series circuit consisting of voltage-dividing resistors R8 and R9 (fifth and sixth resistors), with one end of the R8 being connected to the output terminal 7, as shown in FIG. 2. Of these components, the voltage-dividing resistors R8 and R9 are designed so as to divide the output voltage to the load 6 at the same voltage division ratio as for R6/R7. The error amplifier 31 inputs the connection point voltage between the resistors R6 and R7 and the connection point voltage between the voltage-dividing resistors R8 and R9, and outputs the pseudo feedback signal to the DC-DC converter 10.

Within the IC, an actual output signal from a linear regulator 20 located at the output terminal 7 and a signal obtained by dividing the pseudo feedback signal from the comparator 12 at the same ratio are input to the error amplifier 31. The feedback circuit of the DC-DC converter 10 as a whole, including the error amplifier 31, functions so that these two input signals become equal.

That is, in consideration of the post-transition equilibrium state, the voltage needed to produce the same voltage as that currently output by the series regulator (that is, a target voltage determined by the resistors R1 and R2 and the reference voltage) is output to the comparator 12 by the error amplifier 11, while the error amplifier 11 input is at a voltage level nearly equal to the reference voltage due to virtual short-circuit as a result of feedback.

Even if the target voltage, determined by the resistors R1 and R2 and the reference voltage, is output as a result of activation of the DC-DC converter 10, the error amplifier 11 outputs the appropriate voltage needed to produce the target voltage to the comparator 12. As the input of the error amplifier 11 is at nearly the same voltage level as the reference voltage, the pseudo feedback signal enables the resistor R3 and the capacitor C2—components configuring the phase compensation circuit together with the error amplifier 11—to operate when the internal loop is used, in the same manner as when the target voltage Vt is output.

Therefore, halting the linear regulator 20 and activating the drive circuit 13 after the operation of the DC-DC converter 10 stabilizes make it possible to reduce the voltage variation at the output terminal 7 to an extremely small level during switching, as in the case of embodiment 1 described above.

Thus, even if the voltage-dividing resistors R1 and R2 with an arbitrary voltage division ratio and non-fixed resistance values are externally connected to an IC incorporating both the DC-DC converter 10 and the linear regulator 20, the power devices connected to the load 6 can be switched smoothly without the addition of external components. The power system associated with the embodiment has the excellent features described below, even if the voltage-dividing resistors R1 and R2 are externally installed and have non-fixed resistance values.

Firstly, as operational amplifiers generally do not have a very high frequency band, they do not normally amplify very-high-frequency signal components. In other words, as the error amplifier 31 also serves as a low-pass filter in this embodiment, there is no need to configure a low-pass filter by connecting a relatively large-capacity capacitance such as the capacitor C4 to the resistors R6 and R7 provided to configure the pseudo-feedback-signal loop within the DC-DC converter 10, as shown in FIG. 2. As a small-capacity capacitance functions properly as the capacitor C4, the power system can easily be implemented on chips as an IC.

Secondly, while a signal with its voltage divided by resistors has a high output impedance, the error amplifier 31 output has low impedance. This makes it possible to intentionally form an internal control loop employing the pseudo feedback signal more quickly, thus enabling transition of the DC-DC converter 10 to a steady state in a shorter period of time.

Thirdly, the pseudo feedback signal can be used with the switch SW2 left on, as in the initial state of the DC-DC converter 10, during switching from the linear regulator 20 to the DC-DC converter 10. That is, the drive circuit 13 is activated while the internal loop is used as the control loop. Then, the switches SW2 and SW3 are turned off and on, respectively, to slowly switch the control loop to the external loop. In other words, the pseudo feedback signal switches to the feedback signal from the actual output voltage of the output terminal 7. This optimizes all circuit constants of the power system, further suppressing voltage variations during switching.

Note that while the pulse width modulating step-down synchronous rectification DC-DC converter 10 was used as an example, a frequency modulating DC-DC converter may also be used, and the power system of the present invention is not limited to either instantiation. As for the linear regulator 20, a so-called "linear dropout regulator (LDO)"—a regulator with its output stage made of a p-type semiconductor element—may be used instead to configure the power system.

As described above, the present invention is advantageous for realization in IC form, and causes no variation in output voltage during switching from the linear regulator to the DC-DC converter while providing a power system suitable for realization in IC form.

The invention has been described with reference to certain preferred embodiments thereof. If will be understood, however, that modifications and variations are possible within the scope of the appended claims.

What is claimed is:

1. A power system for outputting voltage to a load by switching between power devices, comprising:

a DC-DC converter for controlling an output voltage at a predetermined level, comprising an inductor, switching elements for supplying input voltage to said load via said inductor, a drive circuit that generates a drive signal for complementarily performing on/off control of said switching elements at a predetermined time ratio, and a control circuit that switches said drive circuit on or off and that controls the time ratio at said switching elements by a feedback signal based on said output voltage to said load;

a pseudo-feedback-signal generating circuit that generates a pseudo feedback signal in synchronization with said drive signal of said DC-DC converter; and a series regulator that supplies said input voltage to said load after stepping down said input voltage;

wherein when said load is light, the drive circuit of said DC-DC converter is switched off and voltage is supplied to said load from said series regulator;

wherein when said load is heavy, the voltage supply from said series regulator is halted and the drive circuit of said DC-DC converter is switched on to supply voltage to said load;

wherein when a voltage supply source to said load is switched from said series regulator to said DC-DC converter, voltage is continually supplied from said series regulator to said load for a predetermined period of time; and wherein said DC-DC converter supplies said pseudo feedback signal in place of the feedback signal to said control circuit while leaving said drive circuit off to control the time ratio at said switching elements, and when said predetermined period of time elapses, halts voltage supply from said series regulator, switches said pseudo feedback signal to said feedback signal, and starts on/off operations of said switching elements by switching on said drive circuit.

2. The power system according to claim 1, wherein said pseudo-feedback-signal generating circuit comprises a first and a second resistor connected in series between the output side of the control circuit of said DC-DC converter and the ground potential, and a capacitance connected between the connection point between said first and said second resistors and the ground potential, and wherein said pseudo-feedback-signal generating circuit outputs said pseudo feedback signal from the connection point between said first and second resistors.

3. The power system according to claim 2, wherein the feedback signal to said control circuit is obtained by dividing the output voltage to said load by a third and a fourth resistor, and wherein the voltage division ratio at said first and second resistors is set so as to be equal to that at said third and fourth resistors.

4. The power system according to claim 1, wherein said pseudo-feedback-signal generating circuit comprises a first and a second resistor connected in series between the output side of the control circuit of said DC-DC converter and the ground potential, a capacitance connected between the connection point between said first and second resistors and the ground potential, a fifth and a sixth resistor connected in series so that the output voltage to said load is divided at the same voltage division ratio as that at said first and second resistors, and an operational amplifier that inputs the connection point voltage between said first and second resistors and the connection point voltage between said fifth and sixth resistors and outputs said pseudo feedback signal.

* * * * *